Figure 1:
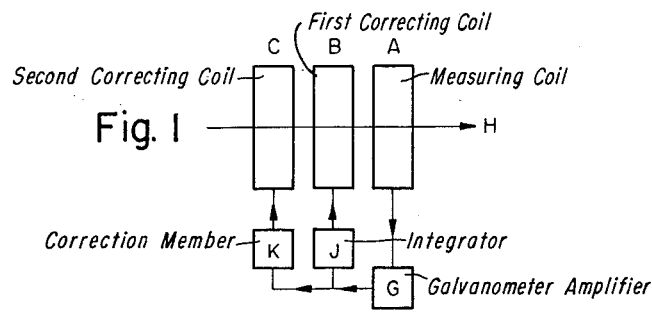

April 11, 1961  H. H. GÜNTHARD ET AL  2,979,641
MAGNETIC FIELD STABILIZER

Filed Feb. 5, 1958  3 Sheets-Sheet 1

United States Patent Office 2,979,641
Patented Apr. 11, 1961

2,979,641

MAGNETIC FIELD STABILIZER

Hans Heinrich Günthard and Johann Jaroslav Primas, Zurich, Switzerland, assignors to Trüb, Täuber & Co., A.G., Zurich, Switzerland Filed Feb. 5, 1958, Ser. No. 713,324

Claims priority, application Switzerland June 12, 1957

7 Claims. (Cl. 317—123)

The present invention relates to a magnetic field stabilizer, i.e. to an apparatus for reducing the fluctuations in the course of time of a magnetic field.

Magnetic fields stable in time are nowadays required in many kinds of apparatuses, be it magnetic fields for the deflection of charged particles in vacuo or in solid bodies (Hall's-effect), be it fields for measuring of quantum like effects of the magnetic polarisation of molecules, atoms and the nuclei of atoms, or of any other effects depending on a magnetic field.

The fluctuations in time occurring in a magnetic field have widely different causes, which may be divided into internal and external disturbances. Internal disturbances may have their reason:

(a) with electro-magnets in insufficient constancy of the exciter current. Although very good stabilizer devices are known which hold the exciter current constant to about $1:10^{-6}$, the requirements made in the constancy of a magnetic field in time are often much greater.

(b) with permanent magnets which do not require any exciter current, the internal disturbance derives from the temperature co-efficient of the magnetic material. Unfortunately just the temperature coefficients of the materials having a high coercive force are very high, namely about $10^{-4}$ per degree centigrade.

In contrast to these disturbances which have their cause in the magnet itself or in its current supply, external disturbances are created by any outside source, and have nothing to do with the magnet as such. With increasing electrification of all sorts of appliances these disturbances assume an ever increasing scope, and one can already quote values of contamination which have to be taken into account when an apparatus has to be provided for installation on any desired place not contaminated by excessive magnetic fields. Since the sites for installations are mostly within towns or within substantial plants, experience has shown that in general disturbance fields of the order of magnitude of 10 milligauss have to be taken into account, viz. in various frequency ranges, namely mostly for very low frequencies (direct current traction, melting furnaces), 16⅔ or 50 cycles per second (alternating current traction) and 50 or 60 cycles per second (mains frequency). Higher frequencies occur relatively rarely and are the more harmless the higher they are, since they are then the easier to be screened off.

Even the disturbance frequencies of 50 or 60 cycles per second are in most cases harmless, since the air gap between the magnet poles is already very well screened from these frequencies by the iron masses of the pole shoes. It may accordingly in general be dispensed with designing a magnetic field stabilizer up to these frequencies; on the other hand 16⅔ cycles per second and screened off only partly, so that in this range a certain sensitivity of the stabilizer is yet desirable.

From this review of the ordinary sources of disturbances it can be seen that the range of a magnetic field stabilizer should extend from the lowest frequencies up to and beyond 16⅔ cycles per second.

As an example for the accuracy of the stabilization required, a magnetic field may be taken as needed for a highly resolving nucleus induction spectrometer. Such fields mostly are in the order of magnitude of 5000 to 10,000 gauss. Spectrometers are considered as of highly resolving power (often called as of extreme resolving power) when these spectrometers are of a resolving power of $1:10^8$. Since the magnetic field intervenes linearly in the resolving power, a magnetic field of 5000 gauss for example has to be kept constant within 50μ gauss in order to permit the resolving required. As compared with the 10 milli-gauss of normal external field disturbances, accordingly a reduction of the disturbances by the factor 200 is required for low frequencies. Since this is however the mean value, an about 5 times higher factor is conveniently chosen for the elimination of the maximum amplitudes, so that the disturbance amplitudes have to be reduced by a factor of about 1000 or by 60 db. This apparently suffices also for the internal disturbances of an electro-magnet, the supply current of which has already been pre-stabilized to about $1:10^6$.

However such a sensitivity suffices also for a permanent magnet. In a room not directly exposed to sunshine a temperature fluctuation of 5° C. amplitude could be assumed to be the maximum. The magnet may have a time constant of $10^4$ seconds, so that the field variation would amount to about 250μ gauss per second with 5000 gauss field strength and a temperature co-efficient of $2.10^{-4}$ per centigrade. With a stabilization of 60 db a reduction in field variation to 15μ gauss per minute is attainable, which is tolerable for a maximum disturbance. With a thermostatic temperature control of the room this disturbance is further reduced.

Accordingly the present invention has the main object of providing a magnetic field stabilizer capable of reducing variations in a magnetic field by 60 db, namely in a frequency range from about zero to beyond 16⅔ cycles per second, a substantial drop is sensitivity being permissible towards that last mentioned frequency.

With this and other objects in view I provide a magnetic field stabilizer comprising in combination: a measuring coil picking up the fluctuations in the magnetic field, an amplifier having an input connected to the said measuring coil and an output, an integrator connected to the said output, a first correcting coil connected to the said integrat ordirectly, a second correcting coil, and a correcting member interposed between the said integrator and the said second correcting coil, the said amplifier having an amplification factor of $$V_o \cdot \frac{1}{1+i\omega\tau}$$

the said integrator having a current amplification of $$W_j \cdot \frac{1}{i\omega}$$

and the said correcting member having a current amplification of $W_k$. The said $V_o$, $W_j$ and $W_k$ being constants, $i$ being the imaginary unit, $\omega$ the cyclic frequency and $\tau$ a suitably selected time constant, and the said two correcting coils both magnetically influencing the said magnetic field.

Figure 2:
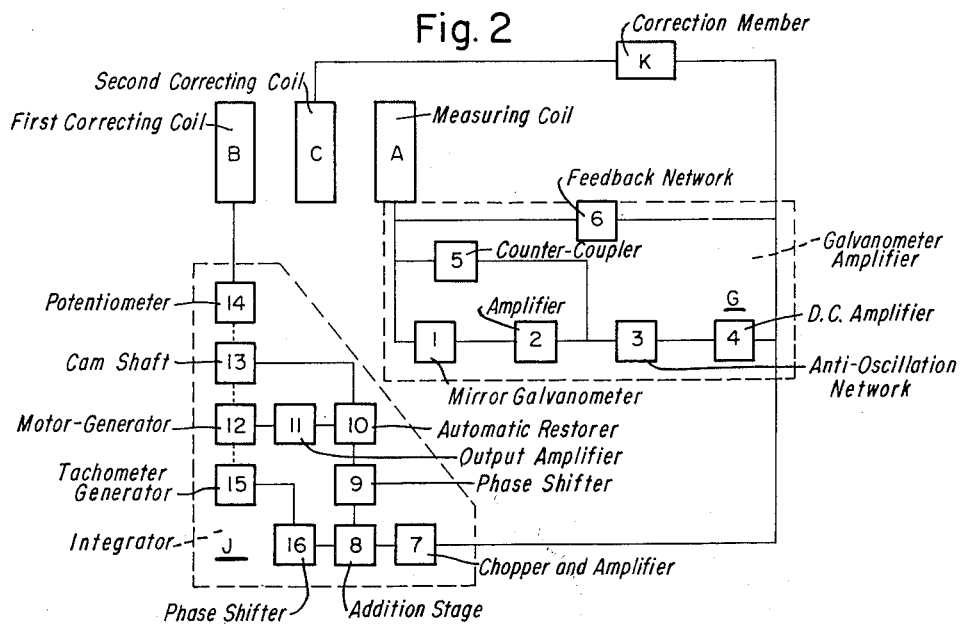
Figure 3:
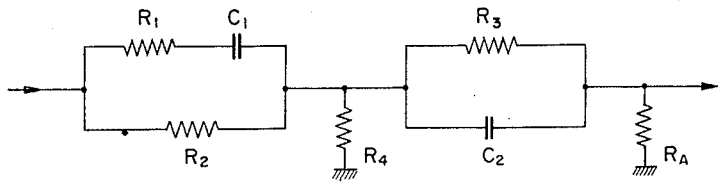
Figure 4:
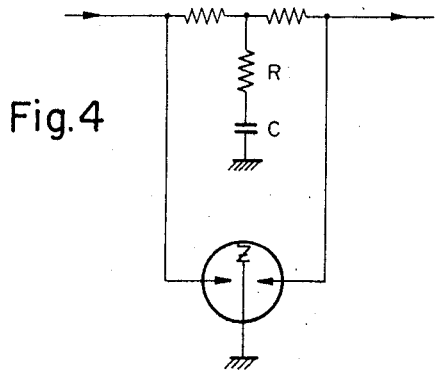
Figure 5:
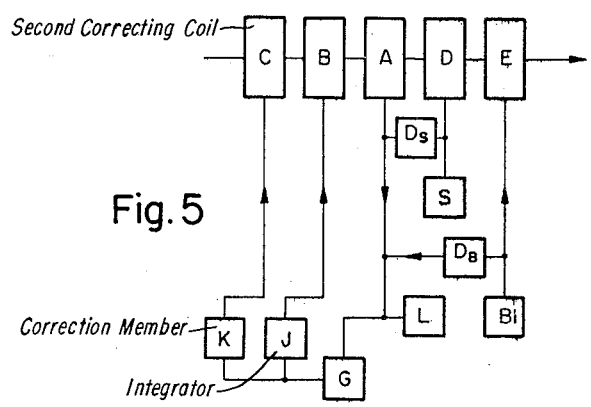
Figure 6:
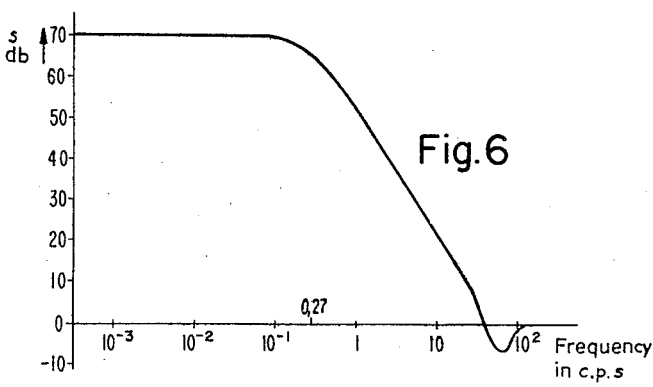

These and other features and objects of my said invention will be clearly understood from the following description of some embodiments thereof given by way of example with reference to the accompanying drawings, in which:

Fig. 1 diagrammatically shows a simplified embodiment of a stabilizer according to the present invention, Fig. 2 diagrammatically shows a more elaborate scheme of a stabilizer according to Fig. 1, Figs. 3 and 4 diagrammatically show details of the scheme according to Fig. 2, Fig. 5 diagrammatically shows a stabilizer according to Fig. 1 adapted to be operated for the solution of special problems, and Fig. 6 is a graph plotting the stabilization attainable with the stabilizer as a function of the frequency.

Figure 7A:
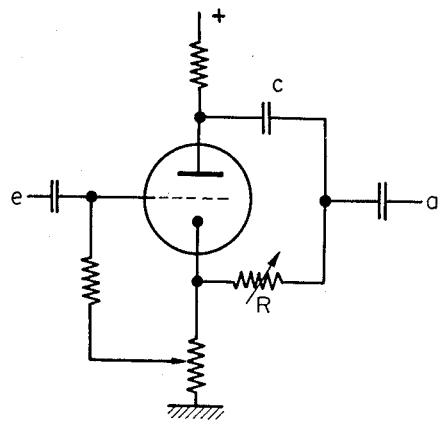

Figs. 7a, b, c diagrammatically show details of the servo-integrator.

A magnetic field stabilizer has become known in which by means of a measuring coil, an amplifier and an integrator fluctuations of the magnetic field generate a current in a correcting coil serving for the compensation of the fluctuations. However, with such a known stabilizer the requirements set forth hereinabove cannot be fulfilled, as will now be explained in more detail with reference to part of Fig. 1.

The components A, G, J and B of this figure diagrammatically represent a known magnetic field stabilizer of the kind referred to. A is a measuring coil, G is a galvanometer amplifier, J an integrator and B a correcting coil which compensates the fluctuations of the magnetic field H as ascertained by the measuring coil A.

The function of the aforesaid part of the magnetic field stabilizer is as follows:

The field is subject to fluctuation in time, and is accordingly a function of time: $H = H(t)$. A field variation $dH$ generates in the coil A a voltage $$E_A(t) = k_A \cdot \frac{dH}{dt} \qquad (1)$$

wherein $k_A$ is a constant characteristic of the coil A.

This voltage is amplified in the galvanometer amplifier to $$E_G(t) = V_G \cdot E_A(t) \qquad (2)$$

wherein $V_G$ is the voltage amplification by the preamplifier G.

The voltage $E_G(t)$ is integrated in the integrator J, which integrator delivers a current $I_B$ to the correcting coil B:

$$I_B(t) = W_J \int E_G(t) dt \qquad (3)$$

wherein $W_J$ is a constant characteristic of the integrator J.

This current generates in the coil B the correcting field $$H_B(t) = k_B \cdot I_B(t) \qquad (4)$$

wherein $k_B$ is a constant characteristic of the coil B. Accordingly there is $$H_B(t) = k_B \cdot W_J \cdot V_G \cdot k_A \cdot H(t) \qquad (5)$$

which means that the correcting field is proportional to that part of the magnetic field which is variable as a function of time. The direction is of course chosen so, that $H_B(t)$ is anti-parallel to $H(t)$, i.e. that $H(t)$ is compensated, so that the resulting field is stable in time. When the whole countercoupling is put $$k = k_B \cdot W_J \cdot V_G \cdot k_A = 1000$$

one of the requirements made hereinabove is fulfilled, namely the reduction of the fluctuations by 60 db or more.

With the known magnetic field stabilizer the integrator is so realized that its transmission function $\beta$ is made dependant on frequency $$\omega : \beta(\omega) = \text{const.} \frac{1}{i\omega}$$

This will now be briefly explained with reference to Fourier's transformation: Fourier's transformation reads:

$$F[F(t)] \equiv f(\omega) \equiv \frac{1}{\sqrt{2\pi}} \int_{-\infty}^{+\infty} F(t) e^{i\omega t} dt \qquad (6)$$

wherein $F(t)$ is any function of the time $t$, $f$, $(\omega)$ is the Fourier transformation of $F(t)$. The Fourier transformation is a function of the cycle frequency $\omega$.

Assuming now $F[I_B(t)] \equiv i_B(\omega)$ and $$F[E_G(t)] \equiv e_G(\omega) \equiv \frac{1}{\sqrt{2\pi}} \int_{-\infty}^{+\infty} E_G(t) e^{i\omega t} dt \qquad (7)$$

to be the Fourier transformation of $I_B$ and $E_A$, respectively. The Fourier transformation of Equation 3 is:

$$i_B(\omega) = \beta(\omega) \cdot e_G(\omega) \qquad (8)$$

If in this equation $$\beta(\omega) = \text{const.} \frac{1}{i\omega}$$

this corresponds according to the Equation 7 to an integration of the variable $E_G(t)$ in time, i.e. exactly to the requirement of Equation 3. The transmission function of the integrator has accordingly to be:

$$\beta(\omega) = W_J \cdot \frac{1}{i\omega} \qquad (9)$$

This known method of field stabilization does not, however, fulfill the above condition that the stabilization has to be effective up to a frequency of about 16⅔ cycles per second, namely for two reasons: on the one hand field variations as slow as possible (temperature coefficient) have to be compensated, i.e. the integrator J has to be designed as a servo-integrator. A servo-integrator, however, has a limited rotational speed and is incapable of following quicker fluctuations. On the other hand it is not possible to make the amplification factor $V_G$ of the galvanometer amplifier independent of frequency, which independence is assumed in the method of integration described hereinabove.

This means that in the normal realisation with servo-integrator the relation (9) is fulfilled only for low frequencies $\omega \leq \omega_0$, wherein $\omega_0$ is a constant of the servo-integrator which is based on the limit speed of the servo-integrator. $\omega_0$ will hereinafter be referred to as the frequency up to which the Equation 9 is fulfilled by the integrator without a disturbing deviation. This frequency lies in any case considerably below the 16⅔ cycles per second required.

In order to permit the fulfilment of the above condition, a magnetic field stabilizer according to the present invention is characterised in that it comprises at least one further correcting coil (C in Fig. 1), which is supplied from the amplifier through a correcting member (K in Fig. 1), and that the amplifier has an amplification factor $$V_0 \cdot \frac{1}{1 + i\omega \tau}$$

the integrator has a current amplification $$W_J \cdot \frac{1}{i\omega}$$

and the correcting member has a current amplification $W_K$, wherein $V_0$, $W_J$ and $W_K$ are constants, $i$ is the imaginary unit, $\omega$ is the cyclic frequency and $\tau$ is a suitably chosen time constant.

In order to extend the frequency range to the extent required, the stabilizer according to Fig. 1 is laid out as follows:

A frequency $\omega \ll \omega_0$ is predetermined, up to which the servo-integrator J functions in accordance with the Equation 9. A time constant $$\tau \gg \frac{1}{\omega_0}$$

corresponds to this predetermined frequency. The galvanometer amplifier is so designed that it produces an amplification depending on frequency $$V_G = V_0 \cdot \frac{1}{1+i\omega\tau} \quad (10)$$

For frequencies $$\omega \gg \frac{1}{\tau}$$

this amplifier constitutes accordingly likewise an integrator. The servo-integrator J is then designed with the current amplification $$\beta_j = W_j \cdot \frac{1}{i\omega} \text{ in the range } 0 \leq \omega \leq \omega_0 \quad (11)$$

and the output current of the integrator is fed into the coil B, which generates the field $H_B = k_B \cdot J_B$ (conf. Fig. 1). In the Equations 10 and 11, respectively, $V_0$ and $W_J$ are constants, i.e. independent of frequency.

According to Fig. 1 a further correcting member K is added, having the current amplification $$\beta_K = W_K \quad (12)$$

independent of frequency. This member supplies the correcting coil C and generates there a field $H_c(t)$ which is proportional to the current $I_c$ of the coil C:

$$H_c(t) = k_c \cdot I_c(t) = k_c \cdot W_K \cdot E_G(t) \quad (13)$$

In order to explain the entire function of the magnetic field stabilizer designed as described, it is convenient to return to the Fourier transformation, and to write:

$$F[H_B(t)] \equiv h_B(\omega)$$
$$F[H_C(t)] \equiv h_C(\omega) \quad (14)$$

Now $$h_C(\omega) = k_C \cdot W_K \cdot e_G(\omega) \quad (15)$$

and according to 5 and 11

$$h_B(\omega) = k_B \cdot i_B(\omega) = k_B \cdot \beta_j(\omega) \cdot e_B(\omega) \quad (16)$$

and according to 2 and 10

$$e_G(\omega) = V_0 \cdot \frac{1}{1+i\omega\tau} \cdot e_A(\omega) \quad (17)$$

so that the whole correcting field becomes $$h_K = h_B + h_C = \left[ k_C \cdot W_K + k_B \cdot W_j \cdot \frac{1}{i\omega} \right] \cdot V_0 \cdot \frac{1}{1+i\omega\tau} e_A(\omega)$$
$$\quad (18)$$

Putting for simplicity's sake $$k_C \cdot W_K = k_B \cdot W_j \cdot \tau = W \quad (19)$$

which may be done by adaption of $k$ or of the W values, then $$h_K(\omega) = W \cdot V_0 \left[ 1 + \frac{1}{i\omega\tau} \right] \cdot \frac{1}{1+i\omega\tau} \cdot e_A(\omega) = W \cdot V_0 \cdot \frac{1}{i\omega\tau} \cdot e_A(\omega)$$
$$\quad (20)$$

Thereby an integration extending over a larger frequency range is attained which becomes clear when transforming 20 back into the time function:

$$H_K(t) = \frac{W \cdot V_0}{\tau} \int E_A(t) dt \quad (21)$$

It is clear that by the frequency-dependent amplification $$V_0 \cdot \frac{1}{1+i\omega\tau}$$

of the galvanometer amplifier, by the current connection $$W_j \cdot \frac{1}{i\omega}$$

of the servo-integrator J, by the constant current amplification $W_K$ of the correcting member K and by the adaptation of $W_j$ and $W_K$ the amplification factor of the stabilizer as a whole becomes proportional to $$\frac{1}{i\omega}$$

over the entire frequency range prescribed. By suitable choice of $\tau$ the integration error can be made as small as desired. The overall amplification factor amounts at low frequencies to 60 db or more, and drops towards higher frequencies in such a manner that at 16⅔ cycles per second it yet amounts to at least 10 db, as shown in Fig. 6.

A rather more detailed block diagram of the magnetic field stabilizer according to Fig. 1 is shown in Fig. 2.

The coils A, B, C are assumed to be fitted for example to the pole shoes of an electro- or permanent magnet, the field in the air gap of which is to be stabilized. The voltage generated in the coil A which is proportional to the variation of the field is passed to the terminals of a mirror galvanometer 1 of great voltage sensitivity. The oscillations of the light pointer of this galvanometer are received by a twin photo-electric cell with adjoining amplifier 2, and is amplified, depending on the amplitude, as a positive or negative voltage deviation. The amplified voltage is passed on to a direct current amplifier 4, namely over a network 3 of RC-members which prevent the whole galvanometer—amplifier G from oscillating. In order that the galvanometer does not swing beyond the control range upon sudden variations of the field, a counter-coupler 5 may be necessary. For the purpose of allotting to the galvanometer amplifier as a whole the amplifying factor $$V_G = V_0 \cdot \frac{1}{1+i\omega\tau}$$

a feed-back network 6 acting over the whole of the amplifier is added.

A wiring diagram of the network 6 is for example shown in Fig. 3. The resistors $R_1$ to $R_4$ and capacitors $C_1$ and $C_2$ are to be chosen so that, taking into account the resistance $R_A$ of the coil A, there results the amplification factor $V_0$ and the time constant $\tau$, which latter is to be selected in accordance with the conditions set forth hereinabove. Furthermore the network has naturally to be dimensioned so that the amplifier does not oscillate, i.e. for higher frequencies the amplification factor must decrease more than $$\frac{1}{i\omega}$$

From the galvanometer amplifier the voltage is passed on the one hand to the integrator J, and on the other hand to the correcting member K. In order to be able to supply to the motor generator 12 a voltage of the frequency required, the same is converted in a chopper and amplifier 7 into an alternating voltage. The amplified voltage is supplied through an addition stage 8 to be described hereinafter and a stage 9 for phase shifting and delaying as well as an automatic restorer 10 to an output amplifier 11 which supplies the control voltage for the motor generator 12. This motor generator, which is commercially available under the proprietary name of Contraves 52 MG 08, carries on its shaft a tachometer generator 15, a cam shaft 13 for the automatic restorer 10 and a potentiometer 14 of a type known under the registered trademark "Helipot." The tachometer generator 15, which is being supplied as part of the said motor-generator, produces an alternating voltage which acts on the addition stage 8 in counter-coupling through a phase-shifter 16. This stage adds in the usual manner the counter coupling voltage to the signal voltage whereby a rotational speed of the motor generator is very well proportional to the signal voltage, and accordingly the integration characteristic desired is attained. While the phase shifter 16 has only the object of bringing the phase of the counter coupling voltage in agreement with that of the carrier or chopper voltage, moreover a delay between the signal and counter-coupling is necessary in order to prevent the integrator from oscillating upon a strong counter-coupling. The stage 9 contains accordingly delaying means the principle of which is illustrated in the wiring diagram of Fig. 4. Since the delay amounts to a multiple of the carrier frequency, the input voltage is rectified by one side of an earthed chopper Z; by means of an RC-member the rectified voltage is delayed and is at once chopped again by the other side of the chopper Z. In order that the rectification may succeed, phase shifting means (not shown) of a conventional type have to be built into the stage 9 before the delaying means.

The potentiometer 14 running on the axle of the motor generator 14 to which a constant current source is associataed delivers the current derived from it to the coil B. This current gives the correction desired of the magnetic field variations for slow fluctuations. When the helipot-potentiometer 14 has arrived at one of the ends of its stroke, it is automatically restored to its middle position by the automatic restoring mechanism. Further relays released by the relays $R_1$, $R_2$ and $R_3$ take care that the function of the integrator is interrupted during this restoration period. After the helipot-potentiometer has reached its middle position, the integrator is automatically switched on again.

In Figs. 7a, b, c some of the means used therefore are shown in detail.

Fig. 7a shows by way of example a wiring diagram as used for the phase shifting in 16 and in 9. The input voltage applied between e and earth may be varied in amplitude and phase by a variable RC-member at the output a of a thermionic valve.

Figure 7B:
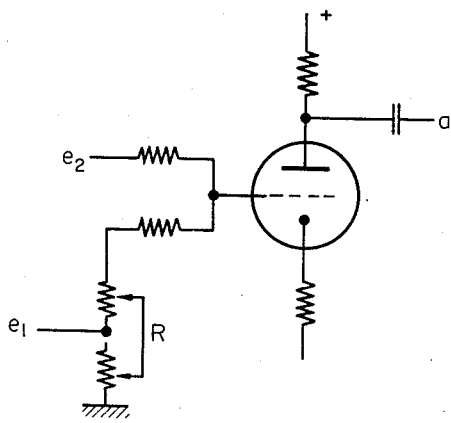

Fig. 7b shows by way of example a wiring diagram for the addition stage 8. At $e_1$ and $e_2$ the voltages to be added are applied, against earth. By adapting members R a certain fraction of the first voltage can be added to the second one, or inequalities in the preceding amplification can be corrected. The sum is derived at a.

Figure 7C:
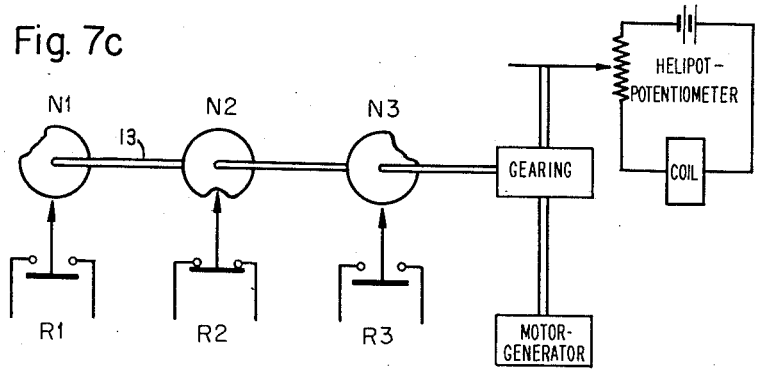

Figs. 7c show a cam shaft 13 which is connected to the motor-generator 12 through a gearing. Moreover the said helipot-potentiometer is directly coupled to the motor-generator. By the cam disc $N_1$ the relay $R_1$ is released when the helipot-potentiometer has reached one end of its stroke. The relay $R_1$ then interrupts the connection of the motor-generator 12 to the control 7—8—9, and switches instead on an auxiliary control voltage, which drives the motor-generator back, until the middle cam disc $N_2$ switches this auxiliary control voltage off through the relay $R_2$, and switches the normal control on again. The same occurs at the other end of stroke with the cam disc $N_3$ and relay $R_3$.

The relays $R_1$, $R_2$ and $R_3$ and the auxiliary control voltage form between themselves the said automatic restoring mechanism 10.

This interruption of the functioning is of such a short duration as compared with the time constant $\tau$ that substantially no disturbance of the operation of the magnetic field to be stabilized occurs since during this period the integration is taken over by the integrating transmission function $$\frac{1}{1+i\omega t}$$

of the amplifier G.

In the correction member K the output voltage of the galvanometer amplifier G is converted into a current proportional thereto through the coil C, for which purpose the correcting member K, depending on the magnitude of the amplification factor $W_K$ may be realised in a known manner by a valve arrangement or alternatively by resistors only, i.e. by a purely electric wiring arrangement, i.e. by a wiring arrangement without any moving mechanical components.

When operating such a stabilized magnet some complications may arise. For the purpose of taking nucleus induction spectra for example a field modulation is necessary in order to seek the resonance signal with a fixed transmitter frequency. The field modulation may follow any function desired, be it in the form of a sinusoidal functoin, a triangular—or saw tooth function. When this modulation is produced in that an appropriate current is passed through a further coil, the magnetic field compensator would compensate and annul the field variation desired. A known possibility for obviating this deficiency consists in applying the derivative of the field modulation function as a voltage to the input of the galvanometer. The magnetic field stabilizer will react thereto as if it had to compensate the field generating this voltage: it will send the integrated function as a current into the correcting coils B and C. Thereby the modulation desired is attained. However, the disadvantage of this kind of generating a modulation consists in that the galvanometer is constantly in motion and at its reversal points is no longer ready for full amplitudes. Thereby the range of dynamic control of the magnetic field stabilizer is reduced.

The invention provides also the means for operating the magnetic field stabilizer according to the present invention by which this drawback can be obviated. The same is characterised according to the invention in that a current corresponding to a modulation function is supplied to a further coil influencing the magnetic field, forming by means of a differentiating device a voltage corresponding to a derivative in time of this function, and applying this voltage to the input of the amplifier of the magnetic field stabilizer.

Thus, by correct compensation of the amplitudes, a field modulation is produced without moving the galvanometer and without loading the magnetic field stabilizer.

The arrangement required therefore is illustrated by way of example in Fig. 5. A generator S, which delivers the modulation voltage of the form desired, supplies also the coil D. The same voltage is passed through an RC-differentiating member $D_S$ at a suitable amplitude to the input of the galvanometer amplifier G of the magnetic field stabilizer M. Thus, the generator S is a source of modulated current to which the modulating coil D is connected.

In Fig. 5 it is moreover illustrated how the magnetic field may be varied stepwise. By Bi (for bias) a direct current source is represented which supplies a stepwise adjustable direct current to a further coil E influencing the magnetic field H.

The output of this direct current source Bi is connected through a differentiating member $D_B$ to the input of the amplifier G. When switching over from one direct current step to another, the differentiating member $D_B$ supplies a voltage pulse, which just compensates the voltage pulse deriving from the measuring coil A so that the amplifier G remains unaffected. In this case the modulation function of the field is a stepped curve, the moments in which the individual steps succeed one another being selectable at will.

For very slow linear modulation a selectable constant voltage supplied by a voltage source L is applied to the input of the amplifier G of the magnetic field stabilizer M. The latter then effects the slow linear field modulation; owing to the integration in time of the constant voltage the polarity of the voltage is reversed before the potentiometer 14 has reached its end position; the same modulation is then effected in the opposite direction.

Each of the coils A, B, C, D, E may naturally consist of several part-coils connected in series or in parallel. On the other hand it is likewise possible to use certain coils by suitable coupling for different purposes so that the number of coils may be reduced.

The measured course of frequencies of the overall stabilization by a magnetic field stabilizer constructed in accordance with Figs. 1 to 4 is plotted in Fig. 6. The ordinate S indicates the factor in db by which the deviation of the field is weakened at a certain frequency. The measured graph shows that the magnetic field stabilizer so constructed complies with the requirements made, namely of an amplification factor $\geq 60$ db at low frequencies ($<10^{-1}$ cycles per second) and even $\geq 10$ db at $16\frac{2}{3}$ cycles per second.

While I have described herein and illustrated in the accompanying drawings what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A magnetic field stabilizer comprising in combination: a measuring coil ascertaining the fluctuations in the magnetic field, and amplifier having an input connected to said measuring coil and an output, an integrator connected to the output of the said amplifier, a first correcting coil connected to the said integrator directly, a second correcting coil, and a correcting member interposed between the said integrator and the said second correcting coil, the said amplifier having an amplification factor of $$V_0 \frac{1}{1+i\omega\tau}$$

the said integrator having a current magnification of $$W_j \cdot \frac{1}{i\omega}$$

and the said correcting member having a current amplification of $W_K$, the said $V_0$, $W_j$ and $W_K$ being constants, $i$ being the imaginary unit, $\omega$ the cyclic frequency and $\tau$ a suitably selected time constant, and the said two correcting coils both magnetically influencing the said magnetic field.

2. A magnetic field stabilizer as claimed in claim 1, comprising in addition: a source of modulated current, a modulating coil connected to said source of modulated current adapted to influence said magnetic field, and an electric differentiating means adapted to form a voltage corresponding to a derivative in time of the function of the modulation of said modulated current, the said voltage being applied to the input of the said amplifier.

3. A magnetic field stabilizer as claimed in claim 2, comprising in addition: a source of direct current, a biasing coil connected to said source of direct current adapted to influence said magnetic field, and control means operatively connected to the said source of direct current adapted to stepwise vary the intensity of said current at selected intervals.

4. A magnetic field stabilizer comprising in combination: a measuring coil ascertaining the fluctuations in the magnetic field, an amplifier having an input connected to the said measuring coil and an output, an integrator connected to the said output, a first correcting coil connected to the said integrator directly, a second correcting coil, and a correcting member interposed between the said integrator and the said second correcting coil, the said amplifier having an amplification factor of $$V_0 \frac{1}{1+i\omega\tau}$$

the said integrator having a current magnification of $$W_j \frac{1}{i\omega}$$

the said correcting member having a current amplification of $W_K$, and the said stabilizer as a whole having an overall amplification factor proportional to $$\frac{1}{i\omega}$$

in the predetermined frequency range, $V_0$, $W_j$ and $W_K$ being constants, $i$ being the imaginary unit, $\omega$ the cyclic frequency and $\tau$ a suitably selected time constant, and the said two correcting coils both magnetically influencing the said magnetic field.

5. A magnetic field stabilizer as claimed in claim 4, wherein the said overal amplification factor amounts to at least 60 db for all the frequencies below 0.1 cycle per second, and to at least 10 db yet at $16\frac{2}{3}$ cycles per second.

6. A magnetic field stabilizer as claimed in claim 4, wherein the said integrator comprises a motor-generator, a potentiometer and an automatic restorer therefore, the said motor-generator mechanically controlling the said potentiometer and the said automatic restorer.

7. A magnetic field stabilizer as claimed in claim 6, wherein the said correcting member consists in a purely electrical wiring arrangement.

No references cited.